Jan. 29, 1952
J. L. HATHAWAY
2,583,531
REVERBERATION CONTROL OF GAIN
Filed June 29, 1944
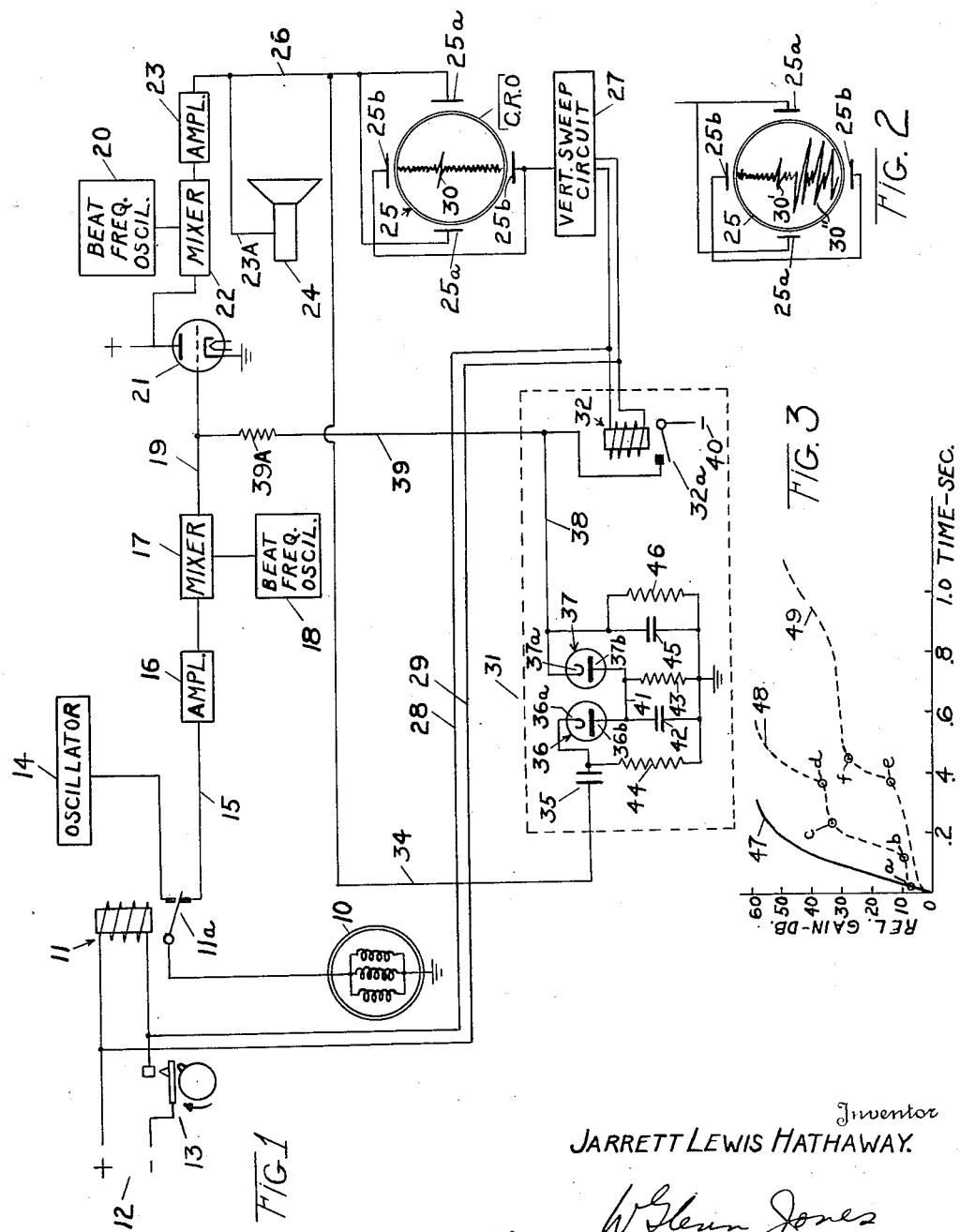
Inventor
JARRETT LEWIS HATHAWAY.
By
Attorney Patented Jan. 29, 1952

2,583,531

UNITED STATES PATENT OFFICE 2,583,531

REVERBERATION CONTROL OF GAIN

Jarrett Lewis Hathaway, Cambridge, Mass., assignor to the United States of America as represented by the Secretary of the Navy Application June 29, 1944, Serial No. 542,796

4 Claims. (Cl. 177—386)

This invention relates to apparatus in which the direction and range of a target is determined by means of the echo technique. In one form of such apparatus a pulse of energy having a directional characteristic is emitted from a projector, which is movable to any position around the horizon. If a target is in the path of any such emitted pulse, an echo thereof will be returned to the projector. The bearing of the target is therefore the same as the bearing of the projector at which the echo pulse was returned and the range may be computed from the time required by the pulse to travel to and return from the target.

More particularly, the invention relates to, and has for a general object, the provision of a novel arrangement for controlling the gain of the "receiver" portion of apparatus of the class described which is used for receiving the echo of the transmitted pulse.

The invention is of especial utility in underwater sound echo ranging and is described in this connection in the following specification. However, it should be expressly understood that it is equally applicable in conjunction with other forms of echo ranging apparatus.

In the application of underwater sound echo ranging apparatus, one of the difficulties encountered results from the fact that immediately following the transmission or projection of a sound pulse or "ping," the receiver element of the apparatus is connected to the projector and reverberation of the pulse is received. If the pulse is long enough and of sufficient strength to carry to and from the target with distinguishable intensity, the reverberation is, at times, very severe. Since an echo may be relatively quite weak, the receiver must have enough gain to amplify it to readily recognizable levels. The high gain required tremendously amplifies the reverberation, producing a blast of sound from the loud speaker which is not only very discomforting to the operator but may at times so lower his aural acuity that he will miss a true target echo. If a visual receiver such as a cathode ray oscilloscope is utilized in lieu of, or in conjunction with a loud speaker, the high level of the reverberation produces a high degree of deflection of the cathode ray beam as it sweeps across the oscilloscope screen with the result that it may be deflected beyond the useful face of the indicator tube, thus making invisible any additional deflection due to an echo pulse.

One specific object of the invention is therefore to provide a novel arrangement for controlling the gain of an underwater sound receiving apparatus in order to reduce the undesirable effect of the initial blast of reverberation.

Another specific object is to provide a novel arrangement for controlling the gain of the receiving apparatus as a function of both time and the instant level of the reverberation.

Still another and more specific object is to provide for initially reducing the gain of the receiver element of echo ranging apparatus to a predetermined level and controlling its recovery in accordance with both time and the instant intensity of the reverberation so that when reverberation is light, the recovery time of the receiver to full gain characteristic is comparatively short but when reverberation is heavy, such recovery time is lengthened considerably.

Yet another specific object of the invention is to reduce the effect of reverberation in the receiver of echo ranging apparatus by initially applying a negative biasing potential on a control grid of one or more amplifier stages in the receiver when an energy pulse is transmitted, then discharging this potential through a circuit which includes a fixed impedance and a first diode of comparatively much lower impedance, when conductive, connected in parallel therewith; the conductivity of the first diode being controlled through a second diode which is connected to the first diode and also to the receiver output so that when reverberation reaches a predetermined threshold value in the receiver output, its effect upon the second diode is such as to make the first diode non-conductive.

These and other objects of the invention will become more apparent from the following description and the accompanying drawings in which:

Fig. 1 is a diagrammatic view of a preferred embodiment of the invention as applied to underwater echo ranging apparatus;

Fig. 2 is a view of the oscilloscope screen showing the nature of the reverberation on the screen without receiver gain control; and Fig. 3 shows plots of typical variations of gain with time in accordance with this invention as affected by reverberation.

For illustrating the invention, I have shown in Fig. 1 a highly simplified diagram of one form of an underwater sound echo ranging system with which the invention may be used. This system includes a projector, or transducer 10 adapted to be placed beneath the surface of the water with its active face in a vertical position. The elements of the projector 10 may be either the piezo-electric or magnetostrictive type and are internally connected to act together.

A relay 11, the winding of which is energized intermittently from a source 12 through timer contactor 13, functions when energized to momentarily connect the output of supersonic frequency, from transmitter oscillator 14 through its contact 11a to the elements of projector 10. The electrical energy imparted to the projector elements, which is a pulse of comparatively short duration, causes a corresponding pulse of compressional wave energy to be projected through the water.

The dimensions of the projector relative to the selected wave length of the energy pulse are such that the pulse is projected normal to the projector and its transmitting pattern has a single major and relatively sharp lobe with its maximum in the plane normal to the active face of the projector.

After the pulse of wave energy is projected into the underwater field, contacts 11a switch immediately to connect the elements of the projector into the receiver portion of the system. The reverberation of the transmitted pulse and later the true echo of the pulse from a remote target such as a submarine, which are picked up by projector 10 are converted into electrical signals or pulses which feed over conductor 15 through an amplifier stage 16, if desired, and then into a mixer stage 17 where they are beat with the output of oscillator 18, if desired, to produce a selected difference frequency output. The output from mixer 17 then feeds over conductor 19 into the control grid of amplifier 21. The output from amplifier 21 is then passed through mixer 22 where they are beat with oscillator 20 to produce a selected audio difference frequency note, thence through amplifier 23 and then via conductor 23A to a loud speaker 24 and/or to the horizontal deflecting plates 25a of a cathode ray oscilloscope 25 via conductor 26.

The vertical deflecting plates 25b of the oscilloscope 25 are connected to a sweep circuit 27 of conventional construction, the arrangement being such that each time relay 11 is energized, a pulse is sent out over conductors 28, 29, to initiate a vertical sweep of the beam in the oscilloscope. Thus with the arrangement described, the pulse echo will be heard over speaker 24 and also effect a horizontal jog 30 of the beam in the oscilloscope as the beam moves upward in its vertical path.

However, as previously explained, the reverberation, unless suppressed would produce an undesirable blast of sound from speaker 24 which might make it difficult to delineate the subsequently following target pulse echo. On the screen of oscilloscope 25, it might produce a deflection pattern similar to that shown in Fig. 2, and from which, it would obviously be difficult to distinguish a true target echo deflection such as jog 30', the reverberation being indicated at 30''.

In accordance with this invention, means are provided for reducing the gain of the receiver immediately following termination of a transmitted pulse to a predetermined level from which recovery is made dependent both upon time and the instant level of the reverberation. In other words, if the reverberation is light, the recovery time of the receiver to full gain characteristic is quite short. But with more severe reverberation, the recovery time is lengthened. Under both conditions, the ultimate result is the same, which result is a suppression of the reverberation for the minimum required time so that better reception of a true target echo pulse may be obtained.

The apparatus for accomplishing this desirable result is enclosed within the broken line block 31. It includes a relay 32 which is energized over conductors 28, 29 at the same time that relay 11 is energized.

The receiver output is fed over conductor 34, through capacitor 35 to the cathode 36A of diode 36. Another diode 37 has its cathode 37a connected via conductor 38 to the fixed contact member of relay contacts 32a, and via conductor 39 and resistor 39A to the control, or input grid of amplifier 21. The movable contact member of relay contacts 32a is connected to a source 40 of negative potential.

The anodes 36b and 37b of diodes 36 and 37, respectively, are tied together through conductor 41, and a filter capacitor 42 and resistor 43 are connected in parallel therewith to ground. A resistor 44 is connected between cathode 36a and ground, and similarly connected to cathode 37a are the parallel arranged capacitor 45 and resistor 46.

*Operation*

In operation, each time that relay 11 is energized and its contacts 11a close, the output from oscillator 14 is connected to projector 10 for a relatively short period whereby a pulse of compressional wave energy is projected or beamed into the water medium. Relay 32 is likewise energized for this same period and when its contacts 32a are closed, a negative potential is applied through them from source 40 to rapidly charge capacitor 45. The negative potential to which capacitor 45 is charged is also applied via conductor 39 and resistor 39A to the grid of amplifier tube 21 to reduce the gain of this tube and thereby reduce the gain of the receiver portion of the system to a preselected low value.

When transmission of the pulse has terminated by switching of relay contacts 11a, relay contacts 32a also open. If diode 37 were considered not to be in the circuit, capacitor 45 would then discharge wholly through resistor 46 in a period of about 2.5 secs., for example. With diode 37 in the circuit, and in a conductive condition, it will be seen that the discharge path for capacitor 45 includes resistor 46 shunted by diode 37 in series with resistor 43. Since diode 37 exhibits a resistance of only a few hundred ohms, it may be considered as a short circuit relative to resistor 46, the latter having a comparatively much higher resistance value. Under this condition, which is the condition when no reverberation is present, the discharge time for capacitor 45 becomes much less, such as about .15 sec., for example. Gain recovery of tube 21, which occurs simultaneously with discharge of capacitor 45, is then rather rapid and its characteristic is shown by curve 47 in Fig. 3.

However, if reverberation is present, which is usually the condition, electrical pulses corresponding thereto are fed into the receiver, when relay contacts 11a are in the receiving position. The resultant potential is suitably amplified through the receiver and its output applied across diode 36. Consequently since the anodes 36b and 37b of diodes 36 and 37, respectively, are tied together by conductor 41, the D. C. potential across diode 36 is applied to the anode 37b of diode 37. If the value of this potential, which is made negative in polarity, at any time equals or exceeds the negative potential at cathode 37a of diode 37, hereinafter referred to as the "threshold," there will be no flow of current through the latter diode; that is, the discharge path for capacitor 45 will be only by way of impedance 46. Thus the recovery time constant for amplifier 21 might be somewhere between the 2.5 sec. and .15 sec. periods previously referred to, depending upon the level of the reverberation.

Reverberation, as found in underwater echo ranging apparatus, follows no particular set pattern and its level may vary greatly with time. For example, the reverberation train may initially be at a high level, followed by an irregular variation in level until it dies out, such as shown at 36" on the oscilloscope screen in Fig. 2.

Curves 48 and 49 in Fig. 3 have been included to illustrate how gain recovery of the receiver might vary with time for two other and different trains of reverberation.

Following curve 48 from the origin, which is the 0 time point, i. e. time of energy pulse transmission, it will be seen that the recovery rate follows along with curve 47 up to point $a$ which indicates that up to point $a$ no appreciable reverberation occured. However, at point $a$, it is seen that rapid recovery stops until point $b$ is reached. This cessation of recovery is of course caused by reverberation occurring between points $a$ and $b$ and which has sufficient level to develop at anode 37b of diode 37 in Fig. 1 a negative potential exceeding that on the cathode 37a of this diode. Thus from points $a$ to $b$, discharge of capacitor 45 is only through resistor 46.

At point $b$, where the reverberation drops in level below the threshold value, diode 37 again becomes conductive and curve 48 again follows the slope of curve 47 until point $c$ is reached. Point $c$ is intended to indicate another increase in reverberation level above the threshold value which persists over to point $d$, preventing normal gain recovery. From point $d$, it is seen that reverberation drops below the threshold value and the normal recovery rate is thereafter followed.

Curve 49 illustrates another condition in which the reverberation is at a much higher level and lasts appreciably longer than in curve 48. It will be seen that during most of this entire recovery cycle, the reverberation is sufficiently strong to influence the recovery rate excepting over the short period between points $e$ and $f$.

In conclusion, it will be evident that this invention presents a novel, low cost, and highly satisfactory arrangement for controlling the gain of echo ranging receivers so as to reduce the effect of reverberation. The reverberation is suppressed by initially lowering the gain of the receiver but its recovery rate is made dependent not only upon time but also upon the level of the reverberation to the desirable end that the gain of the receiver is held down only for the minimum period required to satisfactorily suppress the reverberation.

It will also be evident that the foregoing description concerns only the preferred embodiment of the invention and that various changes and modifications therein may be made by those skilled in the art without departing from the spirit and scope of the invention as defined in the appended claims.

Having thus fully described this invention, I claim:

1. In an echo ranging system including a receiver having at least one amplifier stage including an electron discharge device with a control element and whose gain is dependent on the amplitude of a direct current bias voltage fed to the control element, means for controlling the gain of said receiver comprising, means including a capacitor initially charged to a given voltage for biasing said control element of said amplifier stage to initially reduce the gain thereof, a discharge path for said biasing means including a diode, means for deriving a potential proportional to the level of the reverberation entering said receiver, and means applying the said potential to said diode to render said diode completely non-conductive at the instant when said potential reaches a predetermined magnitude thereby to control the discharge time of said biasing means.

2. In an echo ranging system including a receiver having at least one amplifier stage including an electron discharge device with a control element and whose gain is dependent on the amplitude of a direct current bias voltage fed to the control element, means for controlling the gain of said receiver comprising, means including a capacitor initially charged to a given voltage for biasing said control element of said amplifier stage to reduce the gain thereof, a discharge path for said biasing means including a first diode, a second diode connected to the output of said receiver, and connections between said diodes whereby the discharge path through said first diode is instantaneously rendered either completely conductive or completely non-conductive by the receiver output acting through said second diode.

3. In a sound echo-ranging device wherein a pulse of energy is propagated into a liquid medium and reverberation echoes of gradually decreasing magnitude tend to obliterate the desired echoes, said echo-ranging device including a variable gain amplifier whose gain is inversely related to the amplitude of a control voltage fed thereto, the improvement comprising a control voltage source for said amplifier comprising; a first discharge path for providing a direct current voltage whose amplitude gradually decreases from a first voltage level to a second voltage level when disconnected from its charging voltage source, a source of charging voltage for said first discharge path, switch means for connecting said source of charging voltage to said discharge path during transmission of a pulse of energy to charge said discharge path to said first voltage level and for disconnecting said charging voltage source therefrom upon termination of the transmission of said pulse, a circuit including a first diode rectifier device coupled across said first discharge path to normally aid the discharge thereof, a second diode rectifier device, means coupling the received echoes to said first diode rectifier device through said second diode rectifier device to oppose the voltage coupled to said first diode rectifier device from said first discharge path and to render same non-conductive whereby the discharging of said discharge path is arrested when the amplitude of the signal exceeds a given amplitude level, and means for coupling the voltage generated by said first discharge path to said variable gain amplifier to control the gain thereof.

4. The combination of claim 3 characterized further by said first discharge path including a capacitor in parallel with a resistance.

JARRETT LEWIS HATHAWAY.

REFERENCES CITED

The following references are of record in the file of this patent:

UNITED STATES PATENTS

| Number | Name | Date |
|---|---|---|
| 2,009,459 | Turner | July 30, 1935 |
| 2,158,198 | Prescott | May 16, 1939 |
| 2,167,492 | Sproule | July 25, 1939 |
| 2,276,709 | Wyckoff | Mar. 17, 1942 |
| 2,312,934 | Shook | Mar. 2, 1943 |
| 2,316,354 | Moritz | Apr. 13, 1943 |
| 2,352,825 | Fay | July 4, 1944 |